(No Model.)
R. P. SCOTT.
BICYCLE TIRE.
No. 521,273. Patented June 12, 1894.
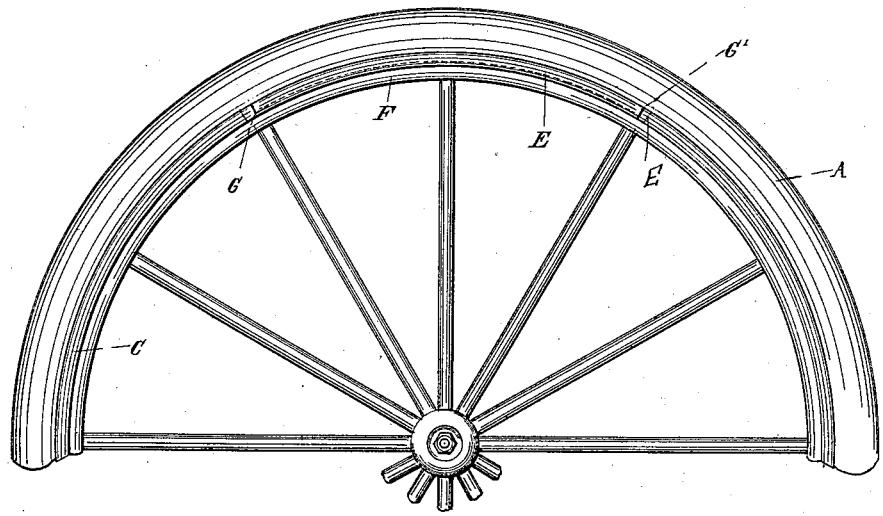
Fig.1.
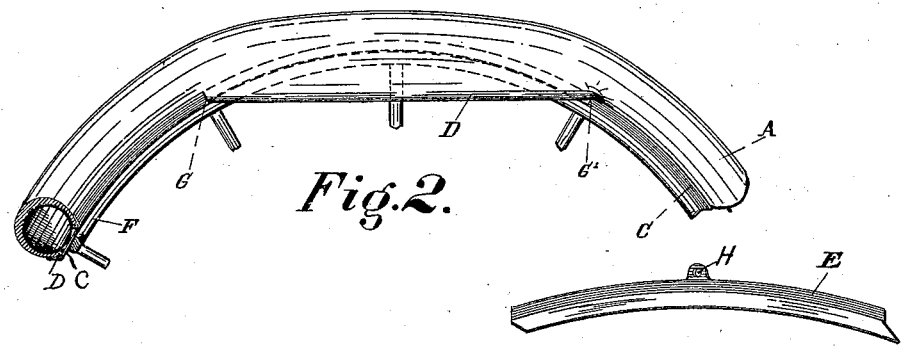
Fig.2.
Fig.4.
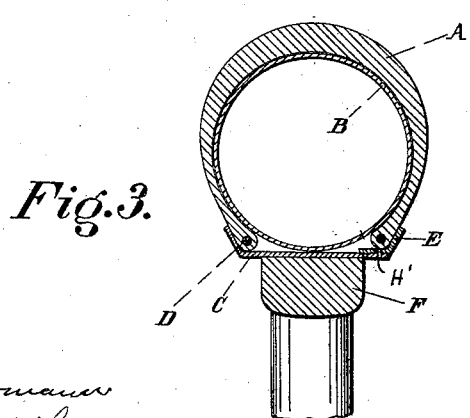
Fig.3.
WITNESSES:
George Mormann
Edgar Smith
INVENTOR
Robert P. Scott

UNITED STATES PATENT OFFICE.

ROBERT P. SCOTT, OF CADIZ, OHIO.

BICYCLE-TIRE.

SPECIFICATION forming part of Letters Patent No. 521,273, dated June 12, 1894.

Application filed February 12, 1894. Serial No. 499,957. (No model.)

*To all whom it may concern:*

Be it known that I, ROBERT P. SCOTT, of Cadiz, Harrison county, Ohio, have invented a new and useful Improvement in Bicycle-Tires, of which the following is a specification.

My invention relates to that class of tires in which non extensible wire selvages are used in connection with a flanged wheel rim and relates to a construction by which the same may be readily attached and detached. A number of tires with endless wire selvages have been devised which are simple in construction and which look when the theory of their operation is understood as if their attachment were but the work of a moment. In fact however all of such prior tires require considerable skill to operate and need an expert to manipulate them quickly. This is not the case with the tire of this application. In fact the object of my invention is to produce a tire which shall not be unusually complicated in construction and which shall be the acme of simplicity in the theory as well as the practice of its operation.

The mode usually adopted for attaching pneumatic tires with endless wire selvages is to place a portion of the circumference of the selvage in an auxiliary circumferential groove in the wheel rim, which these prior constructions provide and with which I dispense, by which sufficient slack is attained to spring the remaining portion of the selvage over the flanges of the rim. The plan I adopt for obtaining this slack is to cut away a portion of the flange of the wheel rim, which cut away portion I fill up with a separate piece after the tire is in place. Although it would at first be supposed that this would require a large portion of the circumference of the rim to be cut away to attain sufficient slack, I have discovered that a very much smaller portion needs to be cut away than would at first be supposed, in fact the width of two spokes is quite sufficient.

In the drawings, Figure 1 represents a side elevation of the wheel and tire; Fig. 2 a portion of the rim with its cut away portion; Fig. 3 a cross section on the line x x of Fig. 1 and Fig. 4 a perspective of the filling piece.

The flanged wheel rim C is mounted upon an interior wood rim F, which may however be dispensed with, and has a cut away portion in one or both of its flanges running from G to G'. The filling piece E is of the shape shown and somewhat longer than the breadth of the cut away portion G G' being provided with an aperture H for the passage of a securing pin H'.

The tire A having endless wire selvages D of a length to snugly fit the base of the wheel rim is of known construction and is here shown in connection with an inner tube B which may however be dispensed with and the tire A be made a complete tube.

To attach my tire to the rim, a portion of the circumference of one of the selvage edges is placed within the flanges of the rim and up to a point immediately under G as shown in Fig. 2, the cut away portion allowing the selvage to become straight instead of curved giving sufficient slack to spring the selvage over the point G' of the rim when the selvage can be slid in place. The inner tube can then be put on and the other selvage edge be sprung in place in a similar manner. The portions of the tire at the cut away portion are then pressed toward the opposite rim, the filling piece is dropped in place and secured by a loose pin H'. The tire springing back comes over this securing pin and holds it in place.

What I claim is—

1. The combination of a flanged wheel rim having a cut away portion, a filling piece therefor and a pneumatic tire having an endless non extensible selvage, substantially as described.

2. The combination of a flanged wheel rim having a cut away portion, a filling piece therefor having an aperture, a pin passing through the aperture for securing the same to the rim and a pneumatic tire having an endless non extensible selvage lying over the pin and holding it in place, substantially as described.

ROBERT P. SCOTT.

Witnesses:
THOS. M. DOBBIN,
C. S. BUCKLIN.